US007711648B2

(12) United States Patent
Howard et al.

(10) Patent No.: US 7,711,648 B2
(45) Date of Patent: May 4, 2010

(54) METHOD AND APPARATUS FOR OBTAINING CONTENT LICENSE RIGHTS VIA A DOCUMENT LINK RESOLVER

(75) Inventors: Christopher J. Howard, Stratham, MA (US); Tracey Armstrong, Beverly, MA (US)

(73) Assignee: Copyright Clearance Center, Inc., Danvers, MA (US)

( * ) Notice: Subject to any disclaimer, the term of this patent is extended or adjusted under 35 U.S.C. 154(b) by 0 days.

(21) Appl. No.: 11/758,391

(22) Filed: Jun. 5, 2007

(65) Prior Publication Data

US 2008/0306873 A1 Dec. 11, 2008

(51) Int. Cl.
*G06F 21/00* (2006.01)
(52) U.S. Cl. .............................. 705/59; 705/51; 705/57
(58) Field of Classification Search ..................... 705/59
See application file for complete search history.

(56) References Cited

U.S. PATENT DOCUMENTS

| | | | | |
|---|---|---|---|---|
| 5,892,900 | A * | 4/1999 | Ginter et al. ................... | 726/26 |
| 2002/0152222 | A1 * | 10/2002 | Holbrook ................. | 707/104.1 |
| 2004/0220834 | A1 * | 11/2004 | Pellinat .......................... | 705/2 |
| 2007/0094352 | A1 * | 4/2007 | Choi et al. .................. | 709/218 |
| 2007/0288434 | A1 | 12/2007 | Cohn et al. | |

FOREIGN PATENT DOCUMENTS

WO      WO 01/35279 A      5/2001

OTHER PUBLICATIONS

Van de Sompel, et al.; "Reference Linking in a Hybrid Library Environment, Part 1: Frameworks for Linking"; D-Lib Magazine; vol. 5, Issue 4; Apr. 1999.
Van de Sompel, et al.; "Reference Linking in a Hybrid Library Environment, Part 2: SFX, a Generic Linking Solution"; D-Lib Magazine; vol. 5, Issue 4; Apr. 1999.
Van de Sompel, et al.; "Reference Linking in a Hybrid Library Environment, Part 3: Generalizing the SFX solution in the "SFX@Ghent & SFX@LANL" Experiment"; D-Lib Magazine; vol. 5, Issue 10; Oct. 1999.
Apps, et al.; "Why OpenURL?"; D-Lib Magazine; vol. 12, No. 5; May 2006.

(Continued)

*Primary Examiner*—Calvin L Hewitt, II
*Assistant Examiner*—Zeshan Qayyum
(74) *Attorney, Agent, or Firm*—Law Offices of Paul E. Kudirka (57) ABSTRACT

A link resolver menu generated by a link resolver server includes a link to a "rights advisor website" containing a program that determines available rights for a resource. When activated, the program uses the resource information in the link to obtain a standard resource identifier and then uses user and context information to access and extract all agreements stored therein that are applicable to the organization to which the user belongs. The resource identifier is then used to determine agreements that are applicable to that resource. An applicable right is selected from each agreement, if available. The rights are then ordered in a tree from the most permissive to the most restrictive. The tree is then traversed from its lowest level upward and the resulting rights are presented to the user.

20 Claims, 7 Drawing Sheets

OTHER PUBLICATIONS

Bennett, et al.; "A JISC Project-Open Linking in a Virtual Learning Environment, (OLIVE)"; URL:http://www.jisc.ac.uk/ploaded_documents/OLIVE_Project_Report.pdf.

Van de Sompel, et al.; "Open Linking in the Scholarly Information Environment Using the OpenURL Framework"; D-Lib Magazine; vol. 7, No. 3; Mar. 2001.

Collins, et al.; "Context-Sensitive Linking: It's a Small World After All"; Serials Review, vol. 28, No. 4, 2002, pp. 267-282.

Shaw, et al.; "JISC Core Middleware and Shared Services Studies"; URL:http//ww.jisc.ac.uk/uploaded_documents/CMSS-Shaw1.pdf.

SISIS Informationssysteme GmbH; "SISIS-Elektr V4.0 Administrtationshandbuch"; URL:http://w3.ub.uni-konstanz.de/v13/volltexte/2006/1841//pdf/elektra_admini_40.pdf.

National Information Standards Organization; "OpenURL Framework for Context-Sensitive Services"; NISO Press; Bethesda, Maryland, USA; 2005.

\* cited by examiner

METHOD AND APPARATUS FOR OBTAINING CONTENT LICENSE RIGHTS VIA A DOCUMENT LINK RESOLVER

BACKGROUND

This invention relates to library services and digital rights management. Reference, or context-sensitive, linking provides the ability to transmit bibliographic data through hypertext links and thereby to connect users who are searching in one reference collection with content in another collection. Such reference collections can include academic research journals, general interest magazines, e-books, bibliographic indexes, and other reference works and additional sources and services associated with the latter items. For example, a reference link can allow a user to move from an abstract of a document located in a collection from one publisher to the full-text content in another vendor database. Another link could allow a user to move from a bibliography in one document to a library catalog of related documents. Other links can allow users to move from one database to another, from a journal article to a web site and from an abstract to an on-line store where a full-text copy of the document can be purchased.

Initially, reference links were simple hyperlinks which were inserted into search result lists by the owner of the reference collection and typically point to predetermined resource copies. As useful as these hyperlinks were, they quickly generated a problem called the "appropriate-copy" problem. This problem occurs when a user locates a link to a resource that has multiple copies available, some of which the user can access via different routes that are governed by distinct access policies and associated with a distinct costs. For example, a simple link may point to a resource copy to which the user does not have access, but the user may have access to another copy of that resource via another route. Alternatively, the user may have access to several copies of the resource via routes that have different costs and, of course, the user would like to obtain the copy at the lowest cost. Thus, in order to be of most use to the user, a link to this resource should point to the resource copy that is most appropriate to that user and the circumstances surrounding user and the link (called the "context").

In order to solve the appropriate copy problem, dynamic links are typically inserted into the collection by the owner. However, rather than pointing to a predetermined resource, each link is dynamic in the sense that the destination is determined or "resolved" at the time that link is accessed based on the user and the context. One method of implementing dynamic link resolution is to use a "link resolver", which is a server managed by the collection owner. Because a collection owner, such as a library, has information regarding the collection, policies, and users, an owner-managed link resolver can provide the desired context-sensitive linking.

Figure 1:
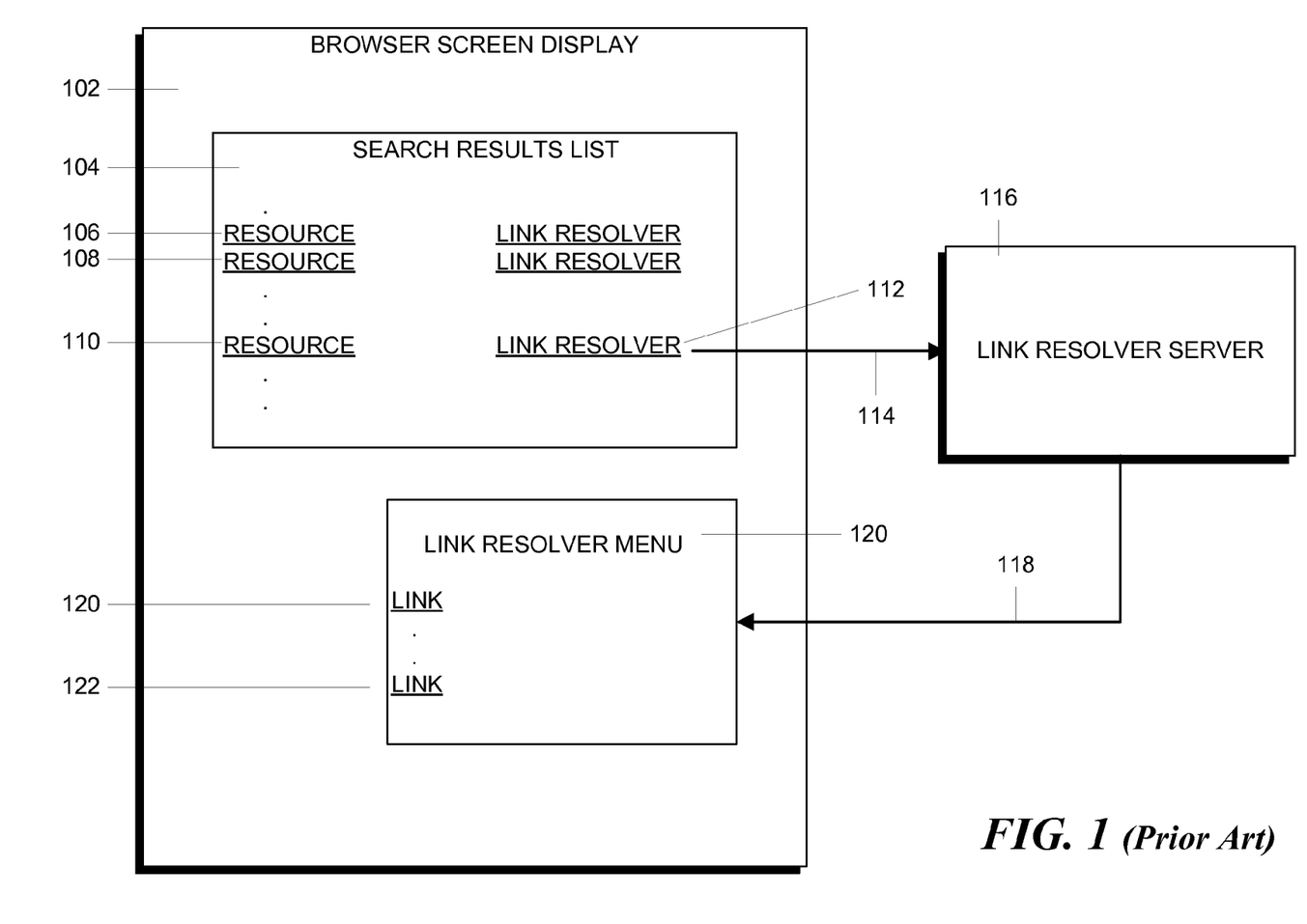
FIG. 1 is a schematic block diagram of a conventional link resolver system.

A typical owner-managed link resolver system 100 is shown in FIG. 1. In this system, a user searching in a collection via a conventional mechanism such as a browser receives, on the browser screen display 102, a search results list 104 containing links associated with resources, such as journals, in response to a query. In FIG. 1 resource links 106, 108 and 100 are shown. In a collection that operates with a link resolver, the search results list is modified to display a separate link resolver link associated with each resource link. For example, link resolver link 112 is associated with resource link 110. The link resolver link 112 contains a URL at which a link resolver server 116 is located and information identifying the resource. Selecting the link resolver link 112, sends this information to the link resolver server 116 as indicated schematically by arrow 114.

Generally, for a given resource, the URL information that is sent to server 116 is constructed according to a predetermined standard. One standard for formatting the URL information that is sent to the server 116 is called "OpenURL." An OpenURL consists of a base URL, which points to the link resolver 116, and a "query" string, which contains bibliographic data identifying the resource, typically in the form of key-value pairs. The OpenURL standard is described in detail in the PDF document Z39_88_2004.pdf available from the National Information Standards Organization, 4733 Bethesda Avenue, Suite 300, Bethesda, Md. 20814. An example of a URL constructed in accordance with the current OpenURL standard is (the conventional http:// preface has been omitted to deactivate the link):

resolver.example.edu/cgi?url_ver=Z39.88-2004
&rft_val_fmt=info:ofi/fmt:kev:mtx:book
&rft.isbn=0836218310
&rft.btitle=Sample+Book+Title In this URL, the initial portion: "resolver.example.edu" is the URL of the link resolver server, for example, server 116. The suffix portion contains version information concerning the URL and resource identification information. In this case, the resource identification information includes the information type (book), the ISBN number of the book and its title.

A resource copy designed to be used with the OpenURL standard will contain only the suffix of the OpenURL query, leaving the URL of the link resolver server blank as follows:

?genre=book&isbn=0836218310&title=Sample+Book+Title

Any resource collection containing that resource will dynamically construct a URL in response to the selection of a link resolver link and preface the query portion of the URL with the URL of its particular link resolver server.

The link resolver 116 parses the elements of an OpenURL received from the link 112 and generates links to appropriate resource copies and services based on information concerning the user and the context which is known to the collection owner. The generated links are then typically displayed as indicated schematically by arrow 118 in the user's browser screen display 102 in the form of a link menu 120 containing the links, for example, links 120 and 122. In order to reduce computational overhead, these links are typically not actually resolved until selected by a user. Thus, any given link may be inactive, reach resources that are not accessible or generate multiple results, etc.

Various link resolver servers are commercially available. A link server that is currently popular is the SFX link resolver server sold by Ex-Libris Limited, 313 Washington Street, Suite 308, Newton, Mass. 02458. This server can generate appropriate links from received information in a known fashion.

However, in systems that use the aforementioned link servers, problems can still arise. For example, link servers cannot provide appropriate links in circumstances where the user does not have access to a desired resource. Further, the collection owner may continually acquire and release access rights through purchase and expiration of subscriptions, etc. Therefore, it may be difficult for the collection owner to know at any given time what the most cost-effective copy would be, even given the user and context information.

SUMMARY

In accordance with the principles of the invention, the link resolver server is constructed to include in the link resolver menu a link to a "rights advisor website" containing a program that determines available rights for the resource. When activated, the program uses the resource information in the OpenURL to obtain a standard resource identifier and then uses user and context information to access and extract all agreements stored therein that are applicable to the organization to which the user belongs. The resource identifier is then used to determine agreements that are applicable to that resource. The agreements are further filtered based on selected characteristics of the user and the organization to which the user belongs and an applicable right is selected from each agreement, if available. The rights are then ordered in a tree from the most permissive to the most restrictive. The tree is then traversed from its lowest level upward and the resulting rights are presented to the user via the browser.

In one embodiment, user and context information is transferred from the link resolver server to the rights advisor program.

In another embodiment, user and context information is obtained directly from the user via a dialog box displayed in the browser and information obtained therefrom is stored in a browser "cookie" on the user's computer for use during a subsequent access of the rights advisor website by the user.

DETAILED DESCRIPTION

Figure 2:
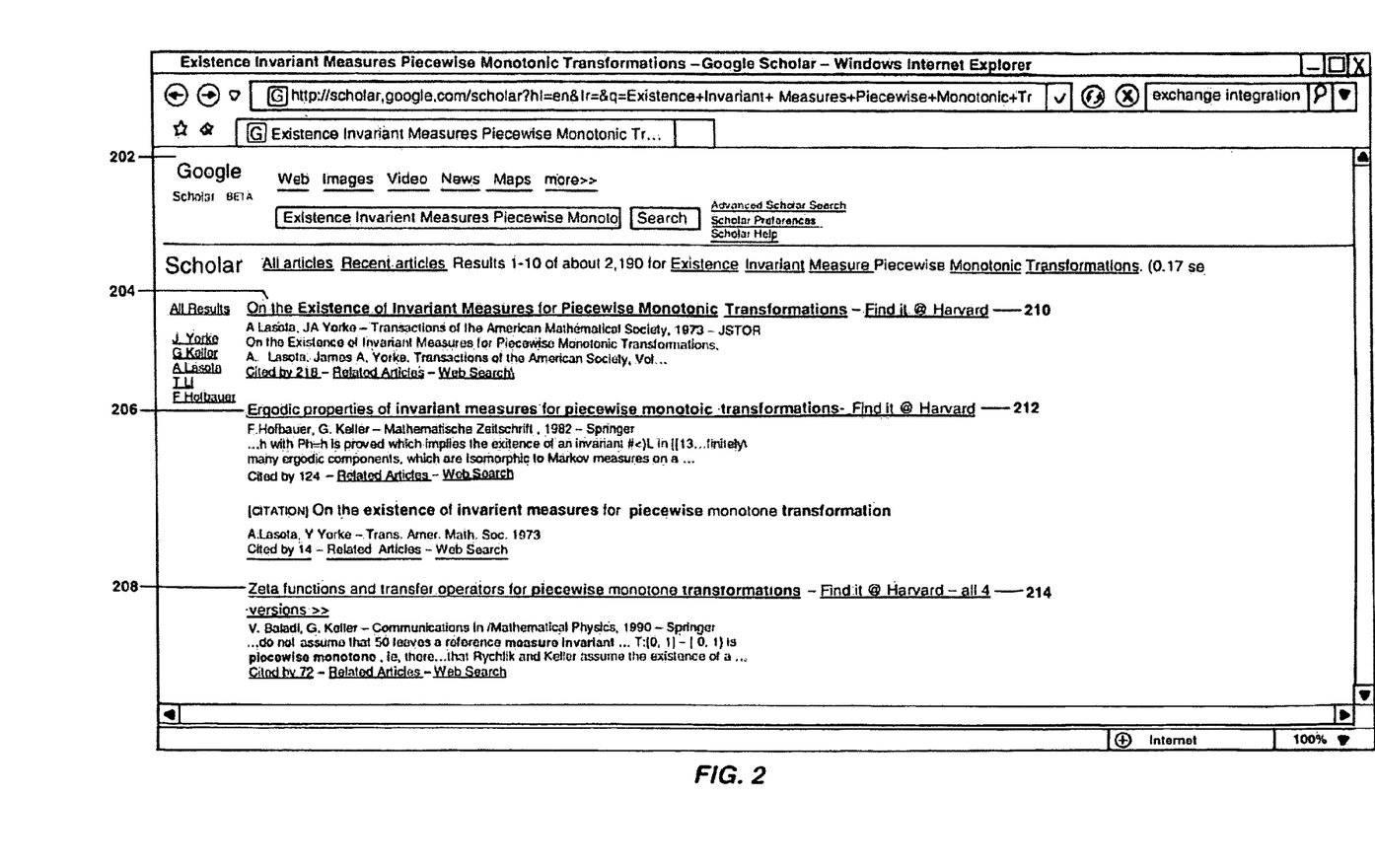
FIG. 2 is a screen shot of an illustrative search results list showing the link resolver links inserted by the collection owner.

FIG. 2 is a screen shot of an illustrative search results list 202 from a query posed in a conventional Internet search engine. The results list 202 comprises a list of hyperlinks 204, 206 and 208 to various journal articles related to the query topic. The destination of each hyperlink depends on the source from which the link was derived. Such a source may be the full-text of the article, a citation in a bibliography, a citation in an indexing or abstracting service. The search engine has been associated with a link resolver. Accordingly, link resolver links 210, 212 and 214 have been associated with search engine links 204, 206 and 208, respectively. As discussed above, selection of one of links 210, 212 or 214 will send a URL to the link resolver server. For example, selection of resolver link 210 might cause an OpenURL such as (the conventional http:// preface has been omitted to deactivate the link):

sfx.hul.harvard.edu/sfx_local?sid=google
    &auinit=A
    &aulast=Lasota
    &atitle=On+the+Existence+of+Invariant+Measures+for+
       Piecewise+Monot onic+Transformations
    &date=1973
    &issn=0028-7369 to be sent to the link resolver server. However, in many cases, full information concerning the resource is not available from the search engine link. for example, the ISSN number of the resource or information concerning the work that includes the resource may not be available. In this case, the link resolver server includes as much information as possible in the URL.

Figure 3:
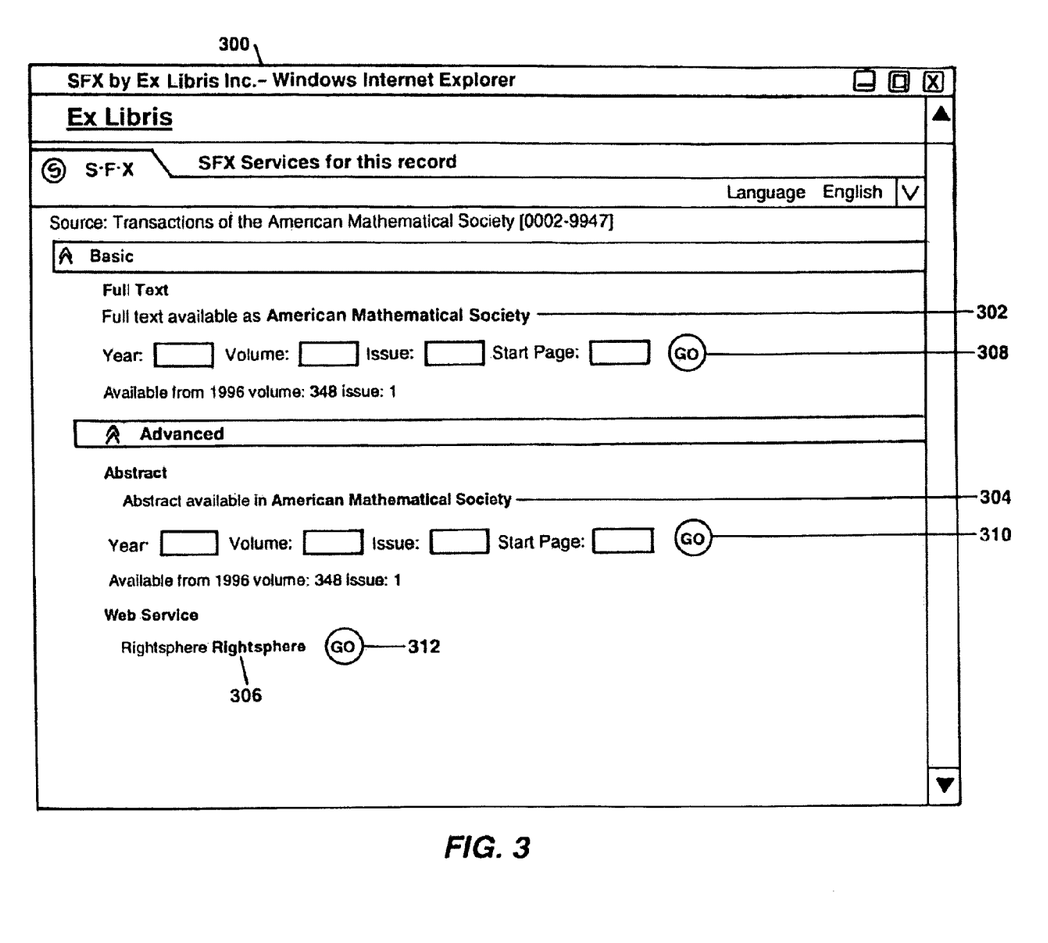
FIG. 3 is a screen shot of an illustrative link resolver menu generated on the user's browser screen when the first link in the link resolver menu is selected.

In response, the link resolver server generates a set of links containing information and services related to the associated search engine link and displays a menu of the generated links. An example of such a menu 300 is shown in FIG. 3. Two conventional links 302 and 304 are shown. Link 302 is to a full-text library collection. It can be activated by entering the desired information in the text boxes for year, volume, issue and start page and selecting "go" button 308. Similarly, link 302 is to an abstracting service. It can be activated by entering the desired information in the text boxes for year, volume, issue and start page and selecting "go" button 310.

In accordance with the principles of the invention, an additional link 306 is added to menu 300. Link 306 can be activated by selecting button 312 and is useful, for example, where the user does not have access to a desired resource and, thus, links 302 and 304 cannot be used. Alternatively, link 306 may be used to locate the most cost-effective copy, given the user and context information.

Figure 4:
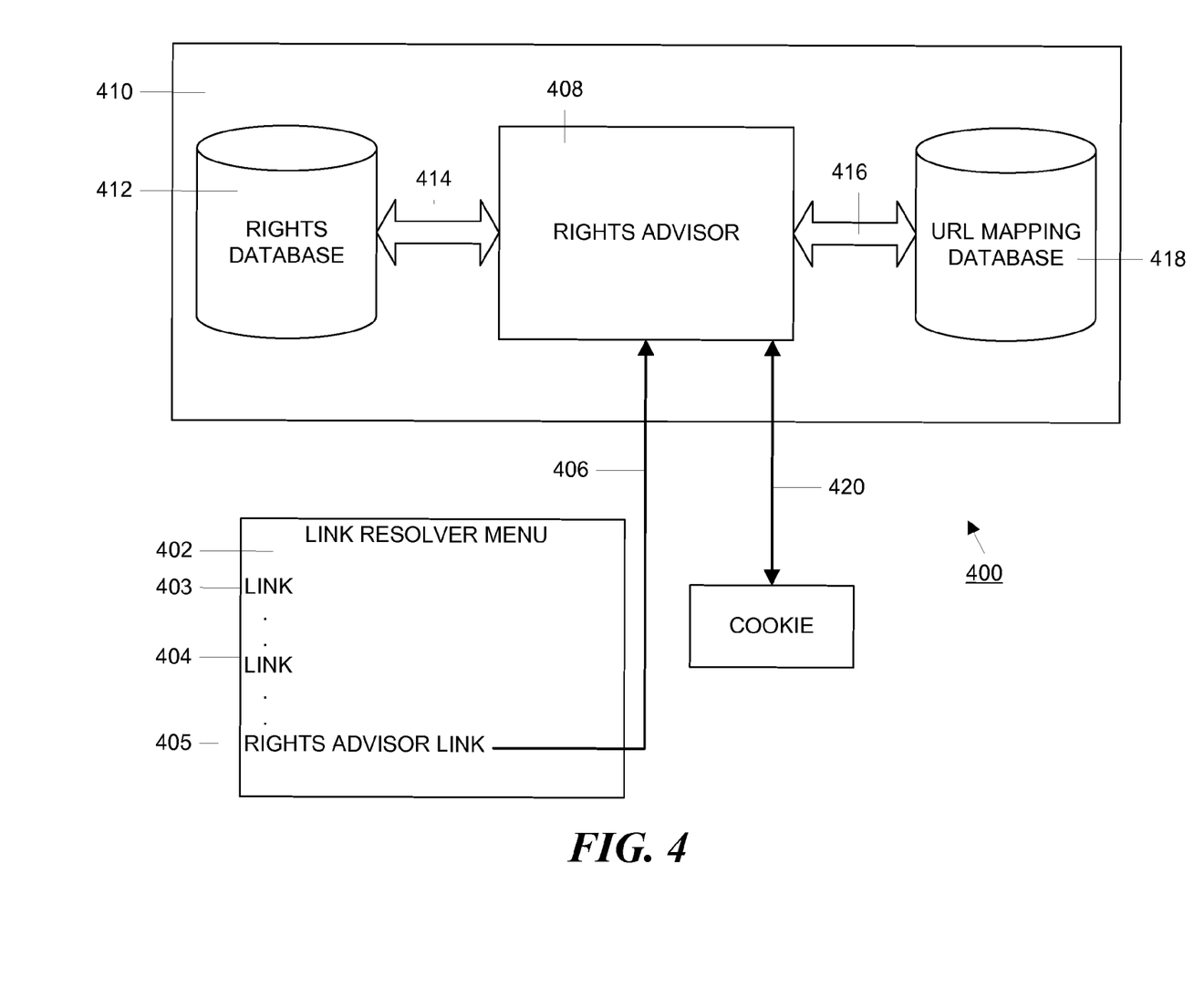
FIG. 4 is a block schematic diagram illustrating a connection between the rights advisor link in the link resolver menu with the rights advisor program.

Selecting link 306 by means of button 312 sends a URL from the web browser to a rights advisor program called "Rightsphere" in the illustrated example. This operation is schematically illustrated in FIG. 4 which illustrates the link resolver menu 402 containing conventional links 403 and 404. Selection of the rights advisor link 405 causes the web browser to access a rights advisor web page 408 hosted by a server in a rights clearinghouse location. More specifically, the browser sends to the rights advisor web page 408 a URL generated by the link resolver server. For example, this latter URL may be an OpenURL as described above in which the first part of the URL is the location of the rights advisor program. The right advisor web page 408 then uses the remainder of the URL to locate rights associated with the resource.

Figure 5:
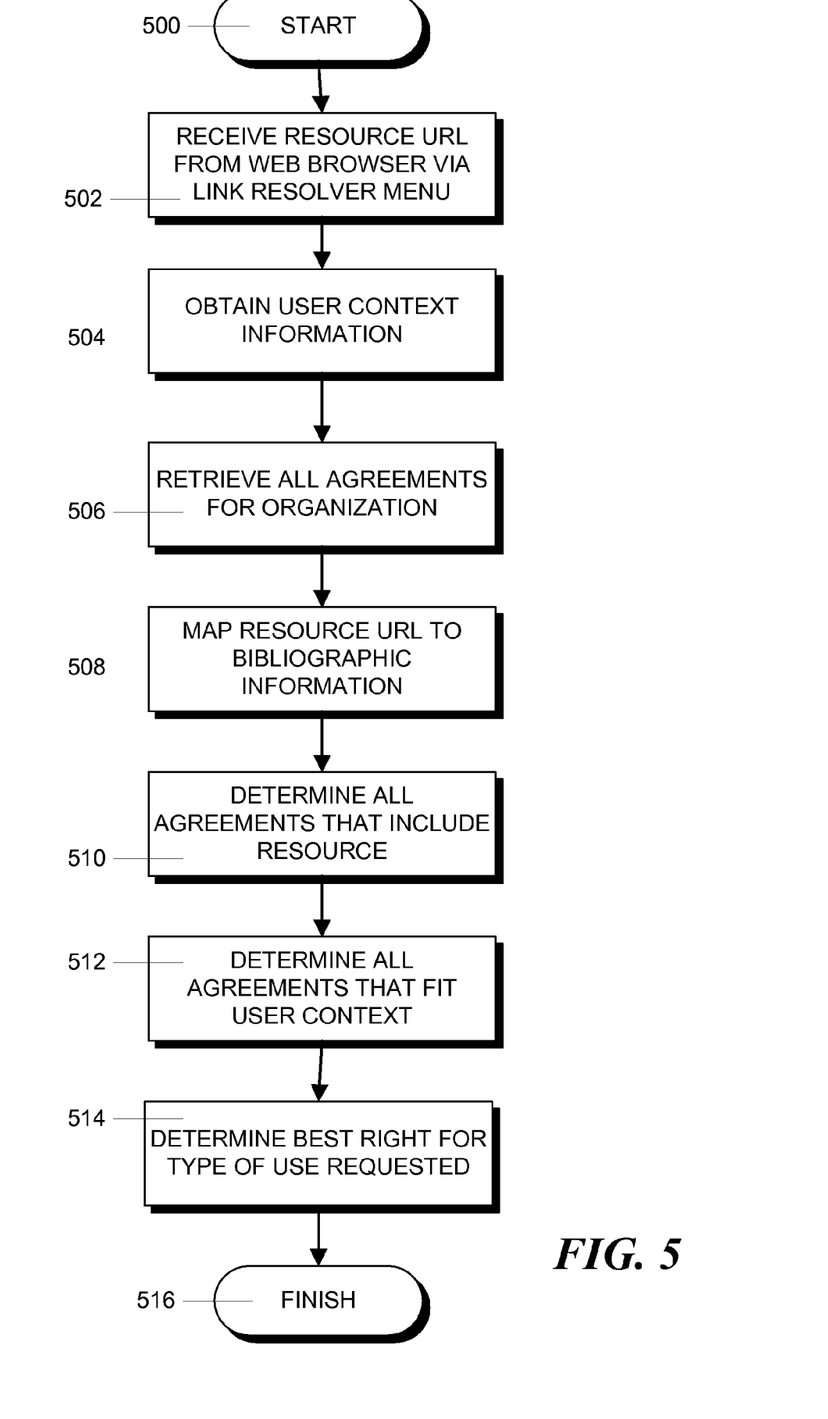
FIG. 5 is a flowchart showing the steps in an illustrative process for determining and resolving rights for a requested type of use.

The process performed by the rights advisor web page 408 to locate and resolve rights is set forth in FIG. 5. This process begins with step 500 and proceeds to step 502 where the rights advisor 408 receives the resource URL from the web browser when the rights advisor link 306 is selected on the link resolver menu 300. Next, in step 504, the rights advisor obtains user context information.

Figure 6:
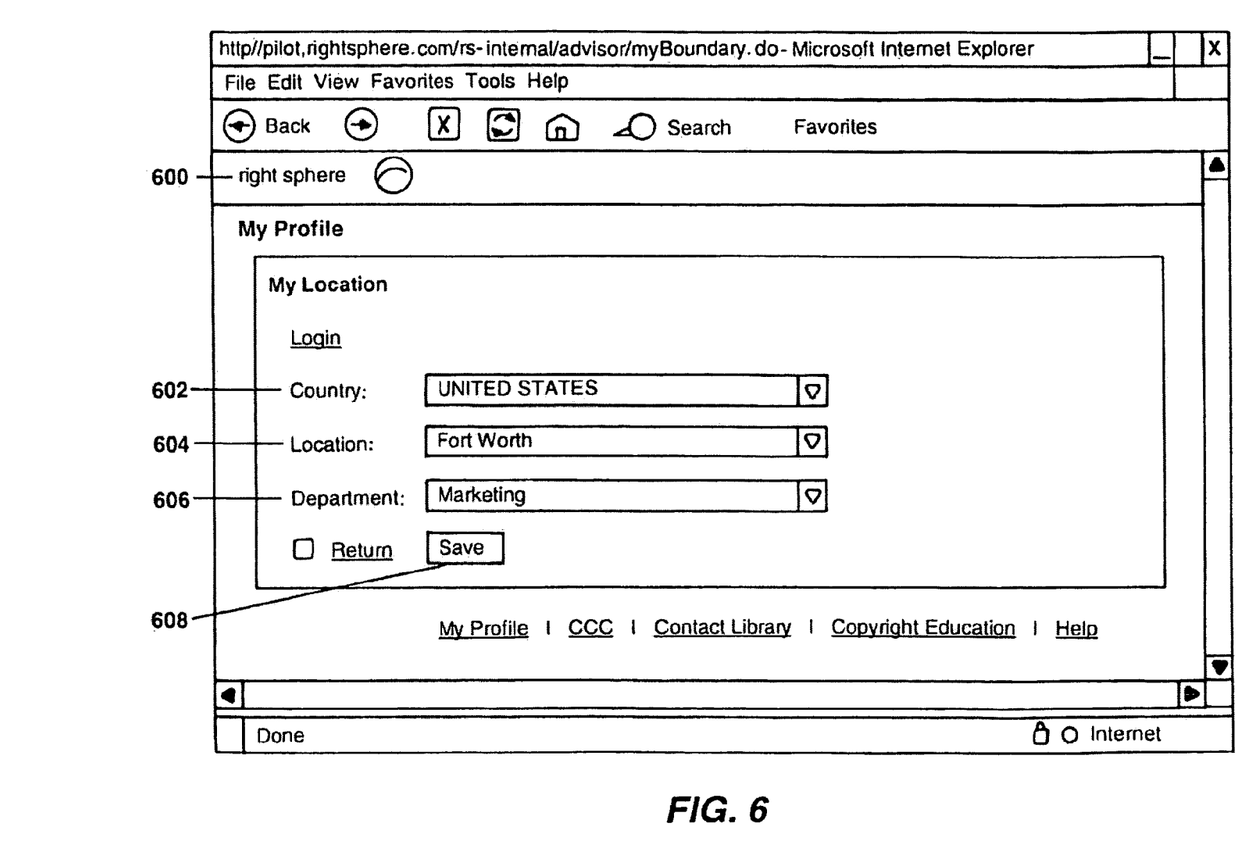
FIG. 6 is a screen shot of an illustrative dialog box for obtaining user context relevant to determining and resolving rights for a requested type of use.
Figure 7:
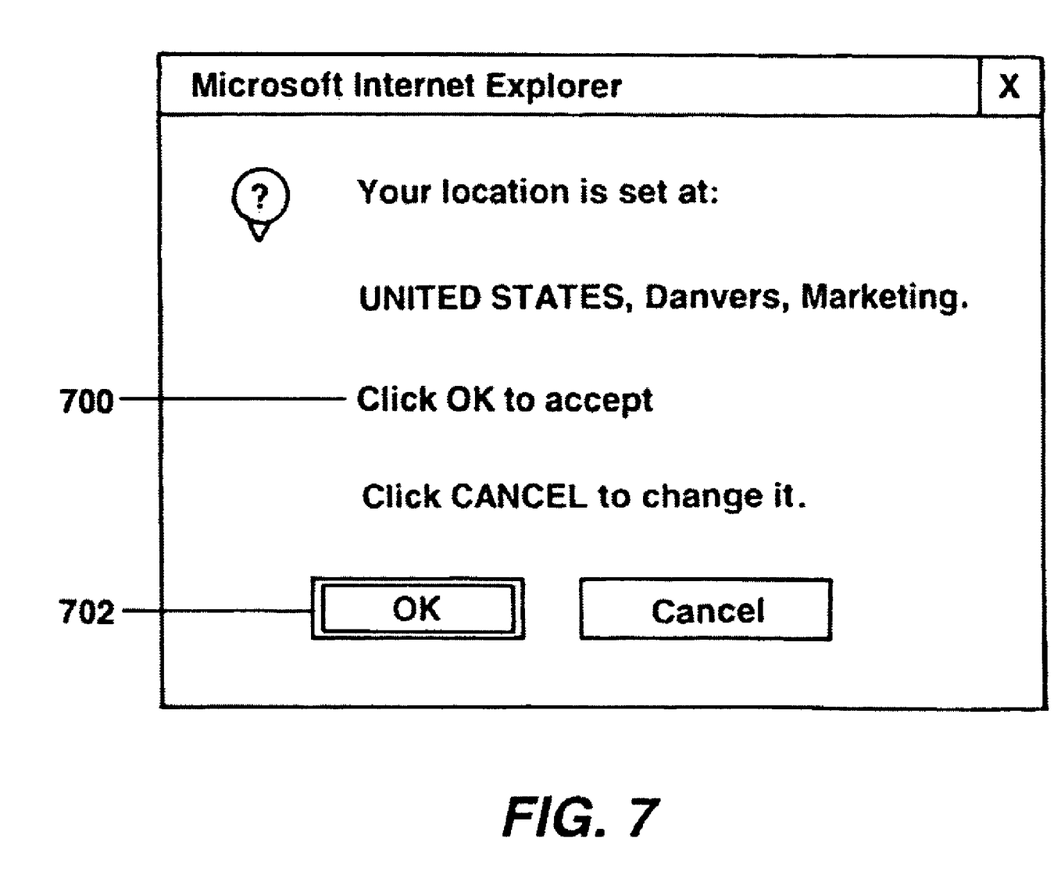
FIG. 7 is a screen shot of a confirmation screen used to confirmation a user location determined from a cookie retrieved from the user's computer.

In one embodiment, user context information is provided by the link resolver server either as part of the URL that is sent to the rights advisor web page 408 or as a separate transmission. In another embodiment, the rights advisor web page 408 displays a dialog box such as dialog box 600 shown in FIG. 6 in order to obtain user context information. Dialog box 600 includes text boxes for obtaining user context information, such as the country, entered in text box 602, the location, entered in text box 604, and the department, entered in text box 606, of the organization in which the user is located. In a further embodiment, the information entered by the user into dialog box 600 can be saved by selecting button 608. This information is formatted into a cookie 422 (FIG. 4) in a conventional manner and saved on the user's computer as schematically indicated by arrow 420. If such a cookie can be retrieved from the user's computer, then only a confirmation screen, such as screen 700 shown in FIG. 7 is displayed to the user. If the stored information is correct the user can accept the information by selected the "OK" button 702. Otherwise, the "Cancel" button can be selected causing the web page 408 to display a dialog box, such as box 600, in order to obtain the correct information.

Rights that are available for an organization are defined by agreements that are stored in the rights database 412. Rights database 412 is arranged as a plurality of tables where rights are stored in a table separate from the content identifiers. Such a database is described in detail in U.S. Pat. No. 5,991,876, the content of which is incorporated in its entirety by reference. In particular, the rights database 412 contains information regarding agreements.

An agreement is any construct under which an organization obtains or expresses rights related to secondary use of content. Such agreements could include a copyright license for an entire collection of publications obtained from a rights clearinghouse. An example of such an agreement is an annual copyright license obtained from the Copyright Clearance Center. Agreements may also be made directly with a publisher, such as the Pharmaceutical Documentation Ring agreement made with the publisher Elsevier. Another type of agreement could be made with other Reproductive Rights Organizations such as a contract with the Copyright Licensing Agency in the United Kingdom. Agreements can also be obtained from various content aggregators. Such an agreement might be a Factiva license. Agreements can also be implied by statutory law, for example, Swiss law allows Swiss companies to share content without royalties. Still other agreements may involve company policy.

In step 506, the rights advisor 408 accesses the rights database as indicated schematically by arrow 414 and retrieves all agreements that apply to the organization. The components of an agreement include boundaries, titles that are included under the agreement, right and terms. Boundaries specify the user context or various constraints a user must meet in order to be covered by the agreement and are defined by three variables: country, location and organization defined attributes.

The country variable has values corresponding to global nationalities, such as United States or France. The location variable has values that correspond to various site location of the organization, such as the Waltham site or the Wilmington site. The organization defined variable may have any values that determine, within that organization, whether the agreement applies to a member of that organization. For example, the variable may specify that a member of the organization must be part of the marketing department or part of the research and development department, etc. to be covered by the agreement.

The country, location and organization defined variables may be assigned the value "any" which indicates that the agreement would apply to any member context which meets the other boundary variables. For example, the organization defined variable may be assigned a value of "any." In this case, the agreement would apply to any member who meets the country and location boundary variables.

An agreement also includes a designation of the publications or titles that it covers. The agreement may apply to collections, which are any grouping of publications. For example, an agreement may apply to all the titles that are included in an EBSCO subscription package. This would be considered a "public" collection; the titles included are defined by the information provider and are standard for all purchasers of the package. Another alternative would be a "private" collection. For example, an organization may create an "a la carte" subscription from a provider like EBSCO. The agreement may also apply to separate publications in addition to, or as an alternative to, collections.

The third component of an agreement is the rights associated with the agreement. Each right is associated with a specific type of use. In order to standardize agreements, a set of distinct rights are predefined. The set of predefined rights could include more or less distinct rights as would be understood by those skilled in the art. For example, an illustrative set of predefined rights could include (1) emailing a copy of the publication to a member of the organization, (2) emailing a copy of the publication to a person who is not a member of the organization, (3) storing a copy of the publication on a local hard drive, (4) storing a copy of the publication on a shared network drive, (5) scan and then email a copy of the publication to a member of the organization, (6) scan and then email a copy of the publication to a person who is not a member of the organization, (7) photocopy publication and share with a member of the organization, (8) photocopy publication and share with a person who is not a member of the organization, (9) share a printed copy of the publication with a member of the organization, (10) share a printed copy of the publication with a person who is not a member of the organization, (11) share a copy of the publication using Lotus Notes™, (12) upload a copy of the publication to an Internet site, (13) post a copy of the publication for advertising purposes and (14) upload a copy of the publication to an electronic paper (soft billboard.) Rights may be associated with each type of use.

Terms may also be associated with each agreement. Terms include rights holder terms, contract terms that cannot be expressed programmatically as a right, certain statutory laws, such as Swiss law allowing publication sharing with other Swiss employees and company policies. Terms may be assigned at the publication, collection and agreement levels. In general, terms associated with rights are tagged as "Restrictive" or "Nonrestrictive". The "Restrictive" tag indicates that the associated right (such as a right to photocopy a publication) is limited by the text of the terms (for example, a restrictive term might be "only internal distribution is allowed"). The "Nonrestrictive" tag indicates the terms do not limit the applicability of the right, perhaps because they extend the scope of the permitted activity (for example, nonrestrictive terms might include "There are no restrictions on the distribution of photocopies of this content").

Next, in steps 508 and 510, the rights advisor determines which agreements apply to the publication for which rights are requested. In order to perform this determination, the rights advisor uses context information in the URL that it receives from the user's browser or which has been obtained from the user by means of the aforementioned dialog box. However, as mentioned above, detailed information concerning the resource may or may not be available. If a recognized standard identifier, such as an ISSN or ISBN number is not available, the resource URL is used to identify the resource. Since resource URLs are often arbitrary, and by themselves provide no consistent means to determine whether a given article belongs to a publication with a recognized standard identifier such as an ISSN or an ISBN. Thus, in step 406, the rights advisor web page 408 maps, or translates, the URL into a standard identifier, where such an identifier is available. Using this standard identifier, the rights advisor web page 408 can check the retrieved agreements for the organization to determine which agreements apply to the specified publication.

URL mapping performed by the rights advisor relies on a variety of URL parsers, each of which uses a parsing algorithm, and a supporting database of URL formats 418. In particular, the rights advisor program 408 has a set of rules for determining which parsers are applicable to a particular URL and a set of parsers that are each able to separate a particular URL into web-site specific identifiers useful for the URL mapping task. Once these specific identifiers have been obtained, they are applied, as schematically indicated by arrow 416, to a database 418 of rules for translating the web-site specific identifiers into standard identifiers such as ISSN or ISBN identifiers. The process of mapping resource URLs to standard identifiers using a set of parsers is disclosed in more detail in U.S. patent application Ser. No. 11/733,423, filed on Apr. 10, 2007, by Christopher Howard, James Arbo and Vivek Shetty. This application is hereby incorporated by reference in its entirety.

Once the standard identifiers have been obtained, they are applied, as indicated schematically by arrow 414 to a database 412 that is keyed by the standard identifiers for publications. This database 412 enumerates publication titles and the rights under which the publications can be used.

Returning to FIG. 5, after the standard identifier has been determined, in step 510, the rights advisor uses that identifier to determine all retrieved agreements that apply to the identified publication. Next, in step 512, a determination is made of all agreements that fit the user context. This determination is made by examining the boundaries of each agreement to then determining whether that agreement covers the user's country and location and that the user meets any organization defined attributes.

In step 514 the best right for the type of use requested is determined. The process then finishes in step 516.

The process of determining the best right as set forth in step 514 involves examining each agreement that applies to the resource and meets the user context to determine the most appropriate right for the specified type of use that is included in the agreement. In performing this examination, each agreement is examined from the "bottom up." That is, more specific rights supersede more general rights. Thus, an agreement is first examined to determine whether a right for the type of use requested has been assigned directly to the specified publication, either by itself or to the publication as contained in a collection. If such a right is found it is the right used for that agreement. If no such right has been assigned to the publication, the agreement is next checked to determine whether a right for requested type of use has been assigned to a collection that includes the specified publication. If so, it is the right that is used for that publication. If no such right is found, then the agreement is checked to determine whether a right for the type of use has been assigned at the agreement level. If so, that right is used for the agreement.

Then, the most applicable rights from all agreements are collected and ordered. In particular, rights are placed into a hierarchy with a specific "best" to "worst" order based on the type of right and whether any terms are associated with the right. For purposes of resolution, rights with terms tagged as "Nonrestrictive" are treated as rights without terms—that is, at the highest level of applicability. The hierarchical order of rights from best applicability to worst applicability is (1) right to use granted with no associated terms, (2) right to use granted with associated restrictive terms, (3) rights available for purchase under a pre-authorized contract, (4) rights available for purchase, but rights holder must be contacted with more information, (5) rights available for purchase, but those rights must be special ordered, (6) contact librarian to determine rights and (7) no rights available. If a right cannot be determined it is treated as (6) above.

After the available rights have been collected and ordered, a determination is made whether the ordering yields one "clear winner." That is, one agreement includes a right that is more applicable than rights included in all other agreements. If so, this "clear winner" is used to determine the rights and terms for the requested type of use. These rights and terms are then displayed to the user. If no "clear winner" exists, then a "tie" exists between two or more agreements. Ties among two or more rights can take several forms. For example, a tie between two or more rights without terms indicates that identical rights are available from two different agreements. Since the rights are identical and indistinguishable, one agreement is selected by a variety of techniques (for example, arbitrarily) and the rights and terms of that agreement are displayed.

Alternatively, a tie between two or more rights with terms results in the display of all such rights together with the terms, so that the end user can make an informed judgment as to the permissibility of the requested activity.

Another example is a tie between two or more rights with "Purchase" status. Such a tie results in the display of a list of the purchase information or capability for all such rights.

In addition, terms associated with rights may be informational. An informational term is a term that presents information to the member without overriding another term or being overridden by another term. Examples of informational terms include statements of company policy for a given type of use or other statements that would give guidance to the user as to how to proceed. Specifying an informational term for an agreement will create a tie condition with other terms on the same agreement, so that the additional information will always be displayed in a list with the terms specified by that agreement. Using the guidelines discussed above, one of the agreements that has the best available right is selected and the rights and terms for this agreement are displayed to the user. The process of determining applicable rights is discussed in more detail in U.S. patent application Ser. No. 11/733,417 filed on Apr. 10, 2007 by William Cohn, Keith Meyer, James Arbo and Vivek Shetty. This application is hereby incorporated by reference in its entirety.

While the invention has been shown and described with reference to a number of embodiments thereof, it will be recognized by those skilled in the art that various changes in form and detail may be made herein without departing from the spirit and scope of the invention as defined by the appended claims.

What is claimed is:

1. A method for resolving rights to reuse content in a resource having information associated therewith displayed on a display screen controlled by a computer having a processor, the method comprising:

(a) displaying by the computer on the display screen a plurality of user-selectable links including an additional link to a rights advisor program running in a memory of a rights server connected to the computer, wherein the additional link includes a location of the rights advisor program and information identifying the resource;

(b) storing by the rights server alt agreements entered into by an organization to which a user belongs;

(c) receiving a selection of the additional link by the computer from a pointing device connected to the computer;

(d) obtaining by the computer in response to the selection of the additional link, user context information, including information identifying the organization;

(e) sending by the computer the user context information and the information identifying the resource from the computer to the rights server;

(f) retrieving by the rights server using the rights advisor program all rights agreements entered into by the organization;

(g) determining, by the rights server using the rights advisor program with the information identifying the resource, rights set forth in the retrieved rights agreements that cover the resource;

(h) creating by the rights server a hierarchy that extends from a worst applicable right to a best applicable right by using the rights advisor program to arrange the rights determined in step (g);

(i) determining by the rights server the best applicable right by examining the hierarchy using the rights advisor program, and (j) presenting by the rights server on the display screen the best applicable rights to the user.

2. The method of claim 1 wherein step (d) comprises obtaining user context information from a link resolver server connected to the computer.

3. The method of claim 1 wherein step (d) comprises obtaining user context information from the user.

4. The method of claim 1 wherein step (d) comprises obtaining user context information from a cookie stored on a computer associated with the user.

5. The method of claim 1 wherein step (f) comprises extracting a resource identifying number from the information identifying the resource.

6. The method of claim 1 wherein step (f) comprises mapping a URL in the information identifying the resource to a resource identifying number.

7. The method of claim 1 wherein step (c) comprises extracting all rights agreements that have been entered into by the organization from a database located at the location of the rights server.

8. The method of claim 1 wherein in step (a), the additional link comprises an OpenURL.

9. The method of claim 8 wherein step (f) comprises parsing the OpenURL to obtain information identifying the resource.

10. Apparatus for resolving rights to reuse content in a resource having information associated therewith displayed on a display screen, the apparatus comprising a computer having a processor and a memory storing instructions, which when executed, cause the processor to perform the steps of:

(a) displaying on the display screen a plurality of user-selectable links including an additional link to a rights advisor program running in a memory of a rights server connected to the computer, wherein the additional link includes a location of the rights advisor program and information identifying the resource;

(b) storing by the rights server all agreements entered into by an organization to which a user belongs;

(c) receiving a selection of the additional link by the computer from a pointing device connected to the computer;

(d) obtaining by the computer in response to the selection of the additional link, user context information, including information identifying the organization;

(e) sending by the computer the user context information and the information identifying the resource from the computer to the rights server;

(f) retrieving by the rights server using the rights advisor program all rights agreements entered into by the organization;

(g) determining, by the rights server using the rights advisor program with the information identifying the resource, rights set forth in the retrieved rights agreements that cover the resource;

(h) creating by the rights server a hierarchy that extends from a worst applicable right to a best applicable right by using the rights advisor program to arrange the rights determined in step (g);

(i) determining by the rights server the best applicable right by examining the hierarchy using the rights advisor program, and (j) presenting by the rights server on the display screen the best applicable rights to the user.

11. The apparatus of claim 10 wherein step (d) comprises obtaining user context information from a link resolver server connected to the computer.

12. The apparatus of claim 10 wherein step (d) comprises obtaining user context information from the user.

13. The apparatus of claim 10 wherein step (d) comprises obtaining user context information from a cookie stored on a computer associated with the user.

14. The apparatus of claim 10 wherein step (f) comprises extracting a resource identifying number from the information identifying the resource.

15. The apparatus of claim 10 wherein step (f) comprises mapping a URL in the information identifying the resource to a resource identifying number.

16. The apparatus of claim 10 wherein step (c) comprises extracting all rights agreements that have been entered into by the organization from a database located at the location of the rights server.

17. The apparatus of claim 10 wherein in step (a), the additional link comprises an OpenURL.

18. The apparatus of claim 17 wherein step (f) comprises parsing the OpenURL to obtain information identifying the resource.

19. Apparatus for resolving rights to reuse content in a resource having information associated therewith displayed on a display screen, the apparatus comprising a computer having a processor and a memory storing instructions, which when executed, cause the processor to perform the steps of:

(a) displaying on the display screen a plurality of user-selectable links generated by a link resolver server which is connected to the computer and manages a resource collection that includes the resource and an additional link to a rights advisor program running in a memory of a rights server connected to the computer, wherein the additional link includes a location of the rights advisor program and information identifying the (b) storing by the rights server all agreements entered into by an organization to which a user belongs;

(c) receiving a selection of the additional link by the computer from a pointing device connected to the computer;

(d) obtaining by the computer in response to the selection of the additional link, user context information, including information identifying the organization;

(e) sending by the computer the user context information and the information identifying the resource from the computer to the rights server;

(f) retrieving by the rights server using the rights advisor program all rights agreements entered into by the organization;

(g) determining, by the rights server using the rights advisor program with the information identifying the resource, rights set forth in the retrieved rights agreements that cover the resource;

(h) creating by the rights server a hierarchy that extends from a worst applicable right to a best applicable right by using the rights advisor program to arrange the rights determined in step (g);

(i) determining by the rights server the best applicable right by examining the hierarchy using the rights advisor program, and (j) presenting by the rights server on the display screen the best applicable rights to the user.

20. The apparatus of claim 19 wherein step (d) comprises storing the user context information in a cookie on a computer associated with the user and obtaining the user context information from the cookie.

\* \* \* \* \*